United States Patent
Malhotra et al.

(10) Patent No.: US 11,374,983 B1
(45) Date of Patent: Jun. 28, 2022

(54) MEDIA CONTENT SERVICE DELIVERY IN A WIRELESS COMMUNICATION NETWORK

(71) Applicant: T-Mobile Innovations LLC, Overland Park, KS (US)

(72) Inventors: Rajil Malhotra, Olathe, KS (US); Anuj Sharma, Broadlands, VA (US); Anil Kumar Mariyani, Ashburn, VA (US); Ramesh Kumar Golla, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/161,924

(22) Filed: Jan. 29, 2021

(51) Int. Cl.
| | |
|---|---|
| *H04L 12/16* | (2006.01) |
| *H04L 65/1066* | (2022.01) |
| *H04L 12/14* | (2006.01) |
| *H04W 8/26* | (2009.01) |
| *H04W 4/20* | (2018.01) |
| *H04L 65/1016* | (2022.01) |

(52) U.S. Cl.
CPC ...... *H04L 65/1066* (2013.01); *H04L 12/1407* (2013.01); *H04L 65/1016* (2013.01); *H04W 4/20* (2013.01); *H04W 8/26* (2013.01)

(58) Field of Classification Search
CPC ............. H04L 65/1066; H04L 12/1407; H04L 65/1016; H04L 29/06027; H04L 12/66; H04L 29/06; H04W 4/20; H04W 8/26; H04M 7/006; H04Q 11/04
See application file for complete search history.

(56) References Cited

U.S. PATENT DOCUMENTS

| | | | |
|---|---|---|---|
| 8,064,909 B2 | 11/2011 | Spinelli et al. | |
| 9,277,522 B2 | 3/2016 | Suryavanshi | |
| 10,524,166 B2 | 12/2019 | Youn et al. | |
| 10,567,448 B2 * | 2/2020 | Bader-Natal | .......... H04L 65/403 |
| 10,736,072 B2 | 8/2020 | Youn et al. | |
| 10,856,265 B2 | 12/2020 | Ryu | |

(Continued)

FOREIGN PATENT DOCUMENTS

WO   2020146327 A1   7/2020

OTHER PUBLICATIONS

"5G; System architecture for the 5G system (5GS)"; 3GPP Technical Specification; Jan. 2021; pp. 1-451; 3GPP TS 23.501 version 16.7.0 Release 16; 3GPP; France.

*Primary Examiner* — Phuongchau Ba Nguyen

(57) ABSTRACT

A wireless communication network is configured to wirelessly deliver a media content service to wireless User Equipment (UEs). The wireless communication network comprises network circuitry. The network circuitry executes wireless network functions and media content functions. The media content functions distribute network addresses to the wireless UEs which use the network addresses to transfer media-content for the media-content service. The wireless network functions monitor performance of the media content functions. The wireless network functions prioritize the media content functions based on their performance. The wireless network functions transfer the prioritized list of the media content functions to the wireless UEs. The wireless UEs communicate with the media content functions on a priority basis responsive to the prioritized list.

20 Claims, 9 Drawing Sheets

(56) References Cited

U.S. PATENT DOCUMENTS

| | | | |
|---|---|---|---|
| 2009/0024717 A1* | 1/2009 | Im | H04L 29/06027 709/218 |
| 2011/0314145 A1* | 12/2011 | Raleigh | H04L 47/12 709/224 |
| 2015/0180748 A1* | 6/2015 | Ding | H04L 65/105 709/224 |
| 2017/0188059 A1* | 6/2017 | Major | H04N 21/23116 |
| 2019/0342851 A1 | 11/2019 | Shan et al. | |
| 2020/0120146 A1 | 4/2020 | Christopher et al. | |

* cited by examiner

MEDIA CONTENT SERVICE DELIVERY IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. Exemplary network functions include Access and Mobility Management Functions (AMFs), Session Management Functions (SMFs), and User Plane Functions (UPFs).

An Internet Protocol Multimedia Subsystem (IMS) delivers Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises network functions and network elements like Call State Control Functions (CSCFs), Telephony Application Servers (TASs), and Short Message Service Application Servers (SMS AS).

A wireless user device attaches to a wireless network core over a wireless access node. The wireless network core transfers network addresses for an IMS to the wireless user device. The wireless user device generates a SIP invite message to initiate a voice call with another wireless user device. The wireless user device transfers the SIP invite message to the wireless access node. The wireless access node routes the SIP invite message to the wireless network core. The wireless network core routes the SIP invite message to the IMS. The IMS transfers a new SIP invite message to the other wireless user device to setup the voice call. When the IMS is unresponsive, the wireless user device hands over to another Radio Access Network (RAN) where it reattempts the voice call. Unfortunately, current wireless network cores ineffectively determine when IMSs are unresponsive and inefficiently require wireless user devices to hand over when the IMSs are unresponsive. Unfortunately, the wireless access cores do not effectively and efficiently mitigate the effects of unresponsive IMS s.

TECHNICAL OVERVIEW

A wireless communication network is configured to wirelessly deliver a media content service to wireless User Equipment (UEs). The wireless communication network comprises network circuitry. The network circuitry executes wireless network functions and media content functions. The media content functions distribute network addresses to the wireless UEs which use the network addresses to transfer media-content for the media-content service. The wireless network functions monitor performance of the media content functions. The wireless network functions prioritize the media content functions based on their performance. The wireless network functions transfer the prioritized list of the media content functions to the wireless UEs. The wireless UEs communicate with the media content functions on a priority basis responsive to the prioritized list.

DETAILED DESCRIPTION

Figure 1:
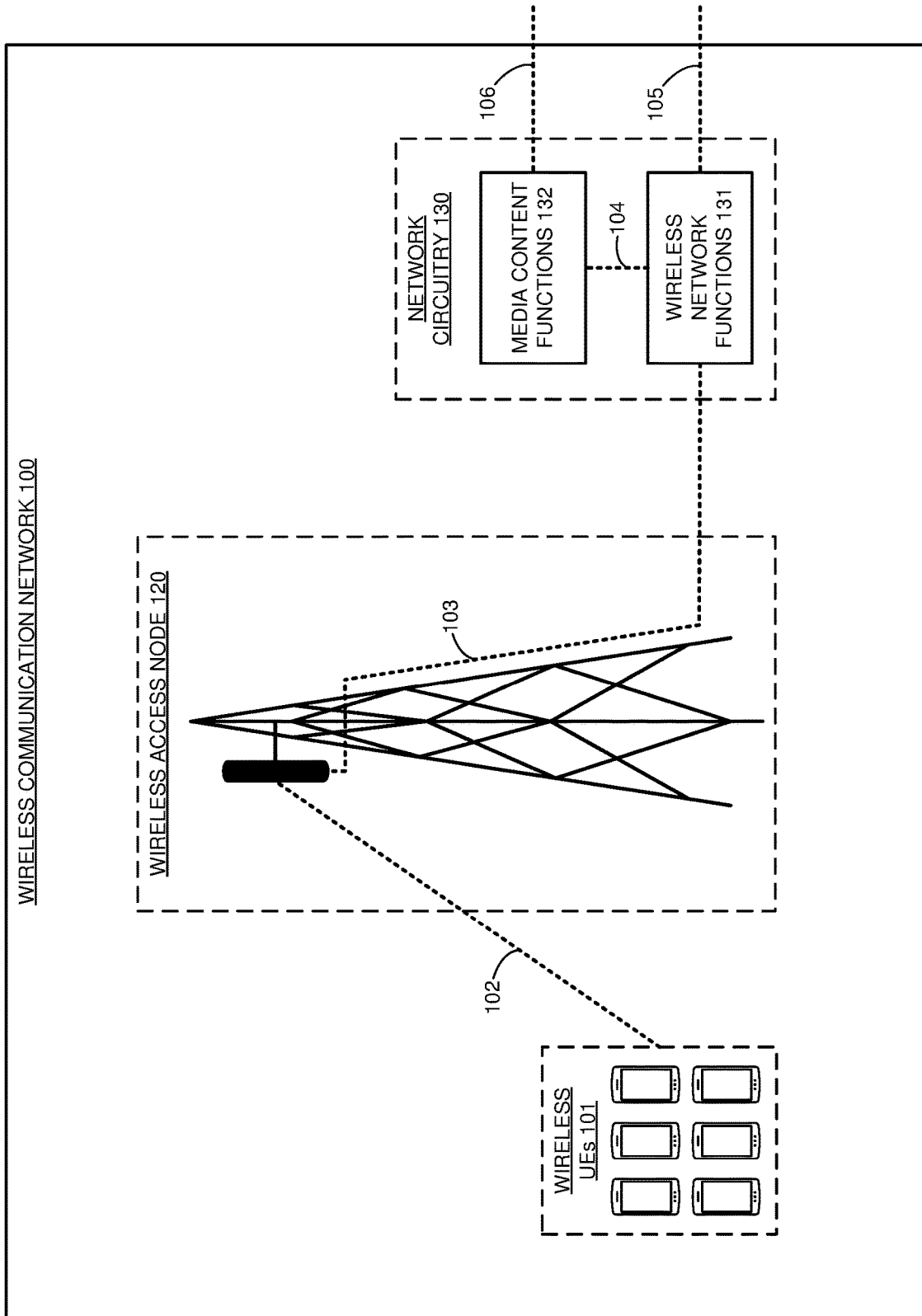
FIG. 1 illustrates a wireless communication network that delivers a media content service to wireless User Equipment (UEs).

FIG. 1 illustrates wireless communication network 100. Wireless communication network 100 is configured to wirelessly deliver a media content service to wireless User Equipment (UEs) 101. Wireless communication network 100 provides wireless data services to UEs 101 like voice calling, video conferencing, text messaging and/or some other type of media content service. Wireless communication network 100 comprises wireless UEs 101, links 102-106, wireless access node 120, and network circuitry 130. Network circuitry 130 comprises wireless network functions 131 and media content functions 132.

Various examples of network operation and configuration are described herein. In some examples, network circuitry 130 executes wireless network functions 131 and media content functions 132. Media content functions 132 distribute network addresses to wireless UEs 101. UEs 101 use the network addresses to transfer media-content for the media-content service. Wireless network functions 131 monitor performance of media content functions 132. Wireless network functions 131 prioritize media content functions 132 based on their performance. For example, wireless network functions 131 may prioritize media content functions 132 by load, responsiveness, and/or other performance metrics. Wireless network functions 131 transfer the prioritized list of media content functions 132 to wireless UEs 101. Wireless UEs 101 communicate with media content functions 132 on a priority basis responsive to the prioritized list. Advantageously, wireless network functions 131 effectively monitor the performance of media content functions 132 to efficiently communicate a prioritized list of media content functions 132 to wireless UEs 101. Moreover, wireless network functions 131 accelerate communications between wireless UEs 101 and media content functions 132.

UEs 101 and wireless access node 120 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Wireless access node 120 and network circuitry 130 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UEs 101 comprise phones, vehicles, sensors, robots, computers, or other data appliances with wireless communication circuitry. Wireless access node 120 is depicted as a tower but access node 120 may use another mounting structure or no mounting structure at all. Wireless access node 120 may comprise Fifth Generation Radio Access Networks (5G RANs), LTE RANs, gNodeBs, eNodeBs, NB-IoT access nodes, LP-WAN base stations, wireless relays, and/or some other wireless network transceivers. UEs 101 and wireless access node 120 comprise antennas, amplifiers, filters, modulation, analog/digital interfaces, and microprocessors. UEs 101, wireless access node 120, and network circuitry 130 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Wireless network functions 131 may comprise Access and Mobility Management Functions (AMFs), Session Management Functions (SMFs), User Plane Functions (UPFs), Policy Control Functions (PCFs), Gateways (GWs), and/or other network elements and network functions that are hosted by a Network Function Virtualization Infrastructure (NFVI). Media content functions 132 may comprise Call State Control Functions (CSCFs), Telephony Application Servers (TASs), Short Message Service Application Servers (SMS ASs), Gateways (GWs), and/or other network elements and network functions that are hosted by a Network Function Virtualization Infrastructure (NFVI).

Figure 2:
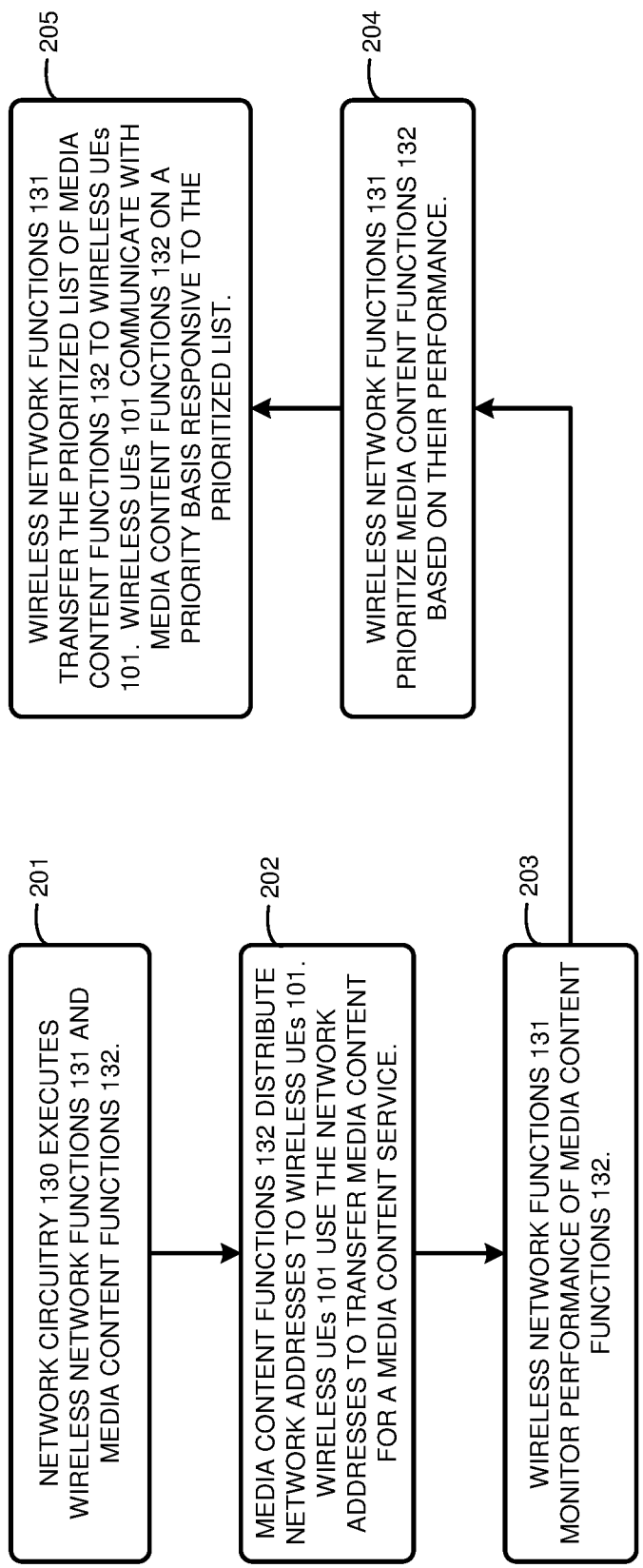
FIG. 2 illustrates the operation of the wireless communication network to deliver the media content service to the wireless UEs.

FIG. 2 illustrates the operation of wireless communication network 100 to wirelessly deliver the media content service to wireless UEs 101. The operation is exemplary and may vary in other examples. Network circuitry 131 executes wireless network functions 131 and media content functions 132 (201). Media content functions 132 distribute network addresses to wireless UEs 101 (202). Wireless UEs 101 use the network addresses to transfer media content for the media content service (202). Wireless network functions 131 monitor performance of media content functions 132 (203). For example, wireless network functions 131 may ping media content functions 132 to monitor the performance of media content functions 132. Wireless network functions 131 prioritize media content functions 132 based on their performance (204). Wireless network functions 131 transfer the prioritized list of media content functions 132 to wireless UEs 101 (205). Wireless UEs 101 communicate with media content functions 132 on a priority basis responsive to the prioritized list (205).

Figure 3:
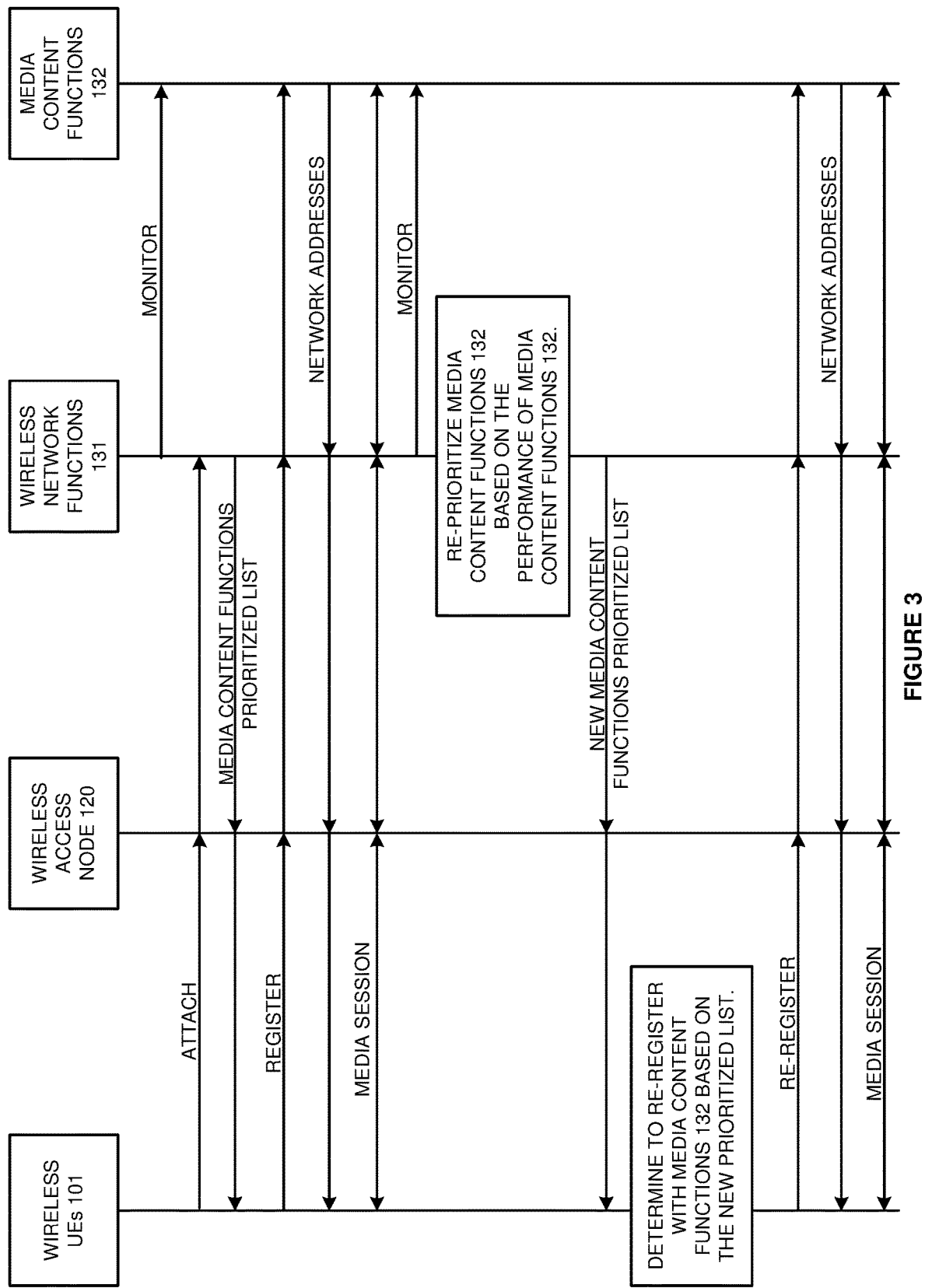
FIG. 3 illustrates the operation of the wireless communication network to deliver the media content service to the wireless UEs.

FIG. 3 illustrates the operation of wireless communication network 100 to wirelessly deliver the media content service to wireless UEs 101. The operation is exemplary and may vary in other examples. Wireless network functions 131 monitor the performance of media content functions 132. UEs 101 wirelessly attach to wireless network functions 131 over wireless access node 120. Wireless network functions 131 transfer a media content functions prioritized list to wireless UEs 101 over wireless access node 120. The media content functions prioritized list ranks the ones of media content functions 132 by performance, load, status, location, and/or some other performance metric. Wireless UEs 101 register with media content functions 132 based on the media content functions prioritized list. Media content functions 132 transfers network addresses to UEs 101. UEs 101 use the network addresses to initiate media content sessions with media content functions 132 over wireless access node 120 and wireless network functions 131.

Wireless network functions 131 monitor media content functions 132. For example, wireless network functions 131 may receive performance updates from media content functions 132 that indicate the load, activity state, and location to monitor media content functions 132. Wireless network functions 131 re-prioritize media content functions 132 based on the monitored performance of media content functions 132. Wireless network functions 131 transfers a new media content functions prioritized list to wireless UEs 101 over wireless access node 120. Wireless UEs 101 determine to re-register with media content functions 132 based on the new media content functions prioritized list. Wireless UEs 101 re-register with media content functions 132 over wireless access node 120 and wireless network functions 131. Media content functions 132 transfer network addresses to wireless UEs 101. Wireless UEs 101 use the network addresses to initiate new media sessions with media content functions 132 over wireless access node 120 and wireless network functions 131.

Figure 4:
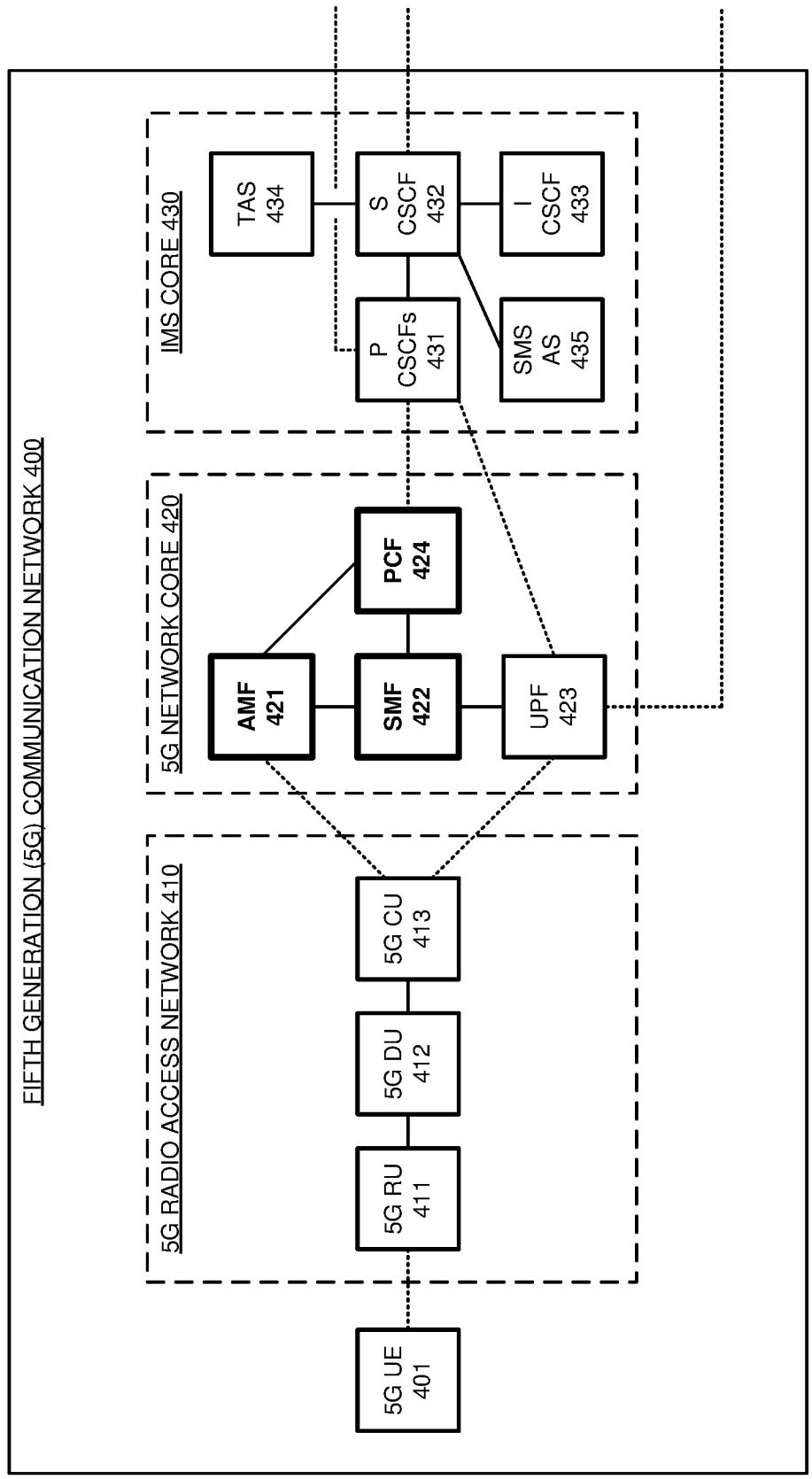
FIG. 4 illustrates a Fifth Generation (5G) communication network that delivers a Mobile Originated Internet Protocol Multimedia (MO IMS) voice session to a 5G User Equipment (UE).

FIG. 4 illustrates Fifth Generation (5G) communication network 400 that serves 5G UE 401 with a Mobile Originated Internet Protocol Multimedia Subsystem (MO IMS) voice call. 5G communication network 400 comprises an example of wireless communication network 100, although network 100 may differ. 5G communication network 400 comprises 5G UE 401, 5G Radio Access Network (RAN) 410, and 5G network core 420, and Internet Protocol Multimedia Subsystem (IMS) core 430. 5G/LTE RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, User Plane Function (UPF) 423, and Policy Control Function (PCF) 424. IMS core 430 comprises Proxy Call State Control Functions (P-CSCFs) 431, Serving Call State Control Function (S-CSCF) 432, Interrogating Call State Control Function (I-CSCF) 433, Telephony Application Server (TAS) 434, and Short Message Service Application Server (SMS AS) 435. Other network functions are typically present in cores 420 and 430 but are omitted for clarity.

UE 401 wirelessly attaches to RU 411 and transfers attachment signaling to CU 413 over RU 411 and DU 412. CU 413 transfers a registration request for UE 401 to AMF 421. AMF 421 interacts other network functions to authenticate and authorize UE 401 for wireless data services. Responsive to the authentication and authorization, AMF 421 interacts with other network functions to generate UE context for UE 401. The UE context comprises Quality-of-Service (QoS) metrics, slice identifiers, network addresses, and a prioritized network address list for P-CSCFs 431. The prioritized list of network addresses for P-CSCFs 431 allows UE 401 to initiate a MO IMS voice call session over IMS core 430. AMF 421 transfers the UE context for UE 401 to CU 413. CU 413 transfers the UE context to UE 401 over DU 412 and RU 411. CU 413 controls DU 412 and RU 411 to serve UE 401. UE 401 exchanges user signaling with AMF 421 and SMF 422 over RU 411, DU 412, and CU 413. UE 401 exchanges user data with UPF 423 over RU 411, DU 412, and CU 413.

UE 401 initiates an IMS registration request. UE 401 generates a SIP message to register with IMS core 430 and uses the network addresses for P-CSCFs 431 to transfer the SIP message to CU 413 over RU 411 and DU 412. CU 413 transfers the SIP message to UPF 423. UPF 423 identifies the network address in the SIP message and transfers the SIP message to the addressed P-CSCF of P-CSCFs 431. The addressed P-CSCF of P-CSCFs 431 receives the SIP message and forwards the SIP message to S-CSCF 432. S-CSCF 432 interacts with other IMS functions to authenticate and authorize UE 401 for IMS voice and IMS texting services. S-CSCF 432 transfers a registration accept message to UE 401 over 5G network core 420 and 5G RAN 410.

PCF 424 monitors the performance of P-CSCFs 431. PCF 424 retrieves CPU occupancy, memory occupancy, active users, geolocation, and/or other performance metrics for the ones of P-CSCFs 431. PCF 424 pings P-CSCFs 431 to determine the responsiveness of the ones of P-CSCFs 431. PCF 424 transfers the performance metrics and responsiveness for P-CSCFs 431 to SMF 422. SMF 422 ranks the ones of P-CSCFs 431 by their performance metrics and their responsiveness. SMF 422 generates a prioritized list of P-CSCFs 431 that indicates the ranks and network addresses for the ones of P-CSCFs 431. P-CSCFs with better performance metrics and faster responsiveness are ranked higher than P-CSCFs with lower performance metrics and slower responsiveness. SMF 422 determines that UE 401 is registered with a low priority one of P-CSCFs 431. In response to the low priority registration, SMF 422 transfers an update session request to UE 401 via Protocol Configuration Options (PCO) over CU 413, DU 412, and RU 411. The update session request indicates the prioritized list of P-CSCFs 431.

UE 401 wirelessly receives the update session request from SMF 422. In response, UE 401 selects the highest ranked one of P-CSCFs 431 for re-registration. UE 401 initiates a new IMS registration request. UE 401 generates a SIP message to register with IMS core 430 and uses the network address for the highest ranked one of P-CSCFs 431. UE 401 transfers the SIP message to CU 413 over RU 411 and DU 412. CU 413 transfers the SIP message to UPF 423. UPF 423 identifies the network address in the SIP message and transfers the SIP message to the highest priority one of P-CSCFs 431. The highest priority P-CSCF of P-CSCFs 431 receives the SIP message and forwards the SIP message to S-CSCF 432. S-CSCF 432 interacts with other IMS functions to register UE 401 for IMS voice and IMS texting services over the highest priority one of P-CSCFs 431. S-CSCF 432 transfers a registration accept message to UE 401 over 5G network core 420 and 5G RAN 410. Once re-registered, UE 401 initiates a MO IMS voice session (or some other type of IMS media session) with IMS core 430 over the highest priority one of P-CSCFs 431 via 5G RAN 410 and 5G core 420.

Figure 5:
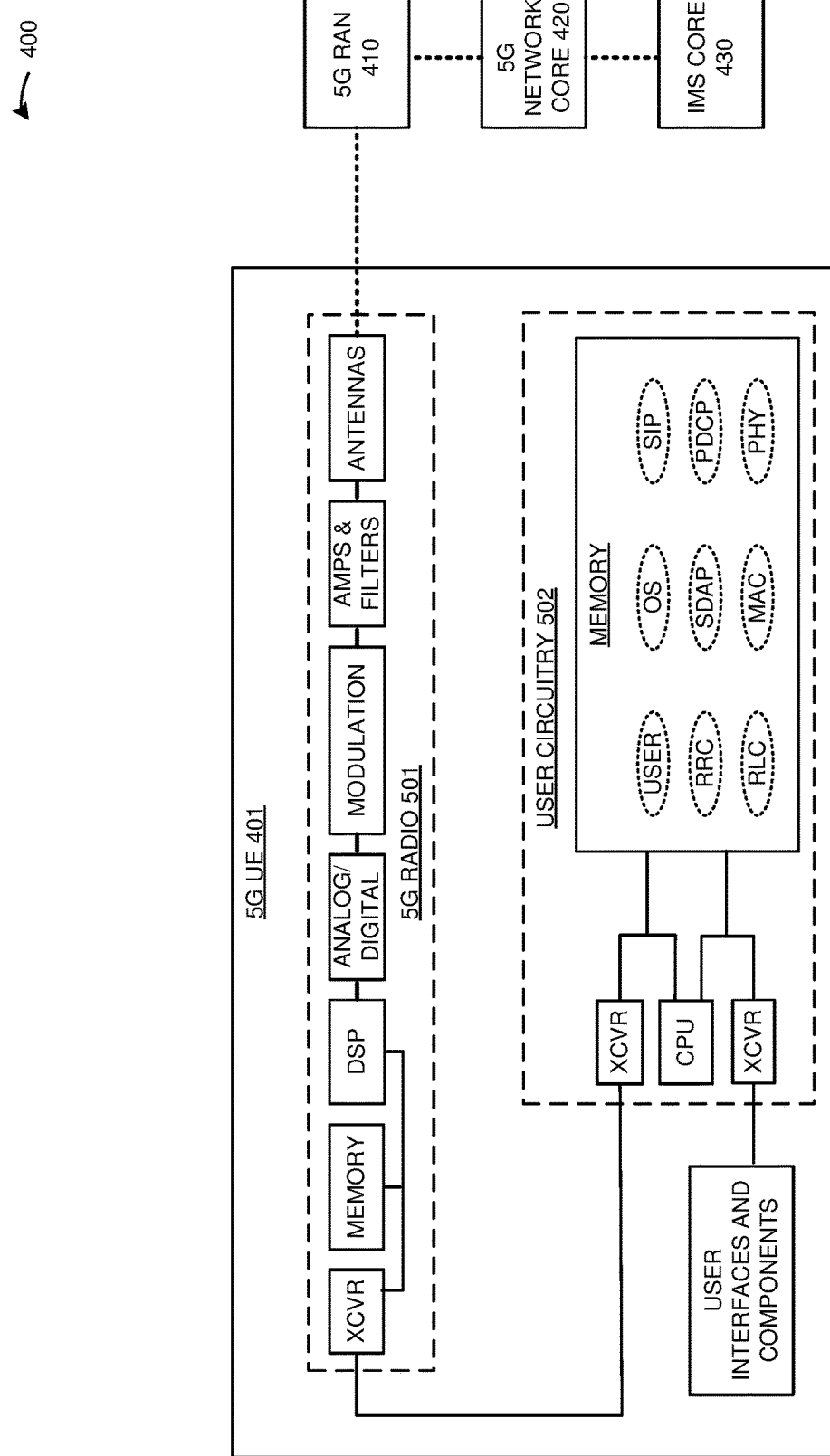
FIG. 5 illustrates the 5G UE that receives the MO IMS voice session from the 5G communication network.

FIG. 5 illustrates 5G UE 401 that initiates an IMS MO voice call over 5G communication network 400. UE 401 comprises an example of UEs 101, although UEs 101 may differ. UE 401 comprises 5G radio 501 and user circuitry 502. Radio 501 comprises antennas, amplifiers, filters, modulation, analog-to-digital interfaces, Digital Signal Processers (DSP), memory, and transceivers that are coupled over bus circuitry. User circuitry 502 comprises memory, CPU, user interfaces and components, and transceivers that are coupled over bus circuitry. The memory in user circuitry 502 stores an operating system, user applications (USER), Session Initiation Protocol (SIP), and SGNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 510 over a SGNR link. A transceiver in radio 501 is coupled to a transceiver in user circuitry 502. A transceiver in user circuitry 502 is typically coupled to the user interfaces and components like displays, controllers, and memory. The CPU in user circuitry 502 executes the operating system, PHY, MAC, RLC, PDCP, SDAP, and RRC to exchange SGNR signaling and data with 5G RAN 410 over radio 501.

In radio 501, the antennas receive wireless signals from 5G RAN 410 that transport downlink SGNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data. In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. SIP functions comprise generating SIP invite messages and processing received SIP messages.

In operation, The RRC in UE 401 transfers attachment signaling to CU 413 over RU 411 and DU 412. The RRC in UE 401 receives network addressing, QoS metrics, and network addresses for P-CSCFs 431 in IMS core 430 from CU 413. The RRC in UE 401 exchanges user signaling with AMF 421 and SMF 422 in 5G network core 420 over 5G RAN 410. The SDAP in UE 401 exchanges user data with UPF 423 in 5G network core 420 over 5G RAN 410. The RRC in UE 401 initiates an IMS registration request. The RRC drives the SIP in UE 401 to generate a SIP message to register with IMS core 430. The SIP uses the network addresses for P-CSCFs 431 to generate the SIP message. The SIP transfers the SIP message to the SDAP in UE 401. The SDAP transfers the SIP message to the addressed one of P-CSCFs 431 in IMS core 430 over 5G RAN 410 and 5G network core 420. The RRC in UE 401 receives a registration accept message from the S-CSCF 432 in IMS core 430 over 5G network core 420 and 5G RAN 410.

The RRC in UE 401 receives an update session request from SMF 422 in in PCO over 5G RAN 410. The update session request directs UE 401 to re-register with IMS core 430 and indicates a prioritized list of network addresses for P-CSCFs 431. In response to the update session request, the RRC in UE 401 selects the highest priority one of P-CSCFs 431 for re-registration. The RRC in UE 401 initiates a new IMS registration request. The RRC in UE 401 drives the SIP to generate a SIP message to register with IMS core 430. The SIP generates the SIP message using the network address for the highest ranked one of P-CSCFs 431. The SIP in UE 401 transfers the SIP message to the SDAP in UE 401. The SDAP transfers the SIP message to the highest priority P-CSCF of P-CSCFs 431 over 5G RAN 410 and 5G network core 420. The RRC in UE 401 receives a registration accept message from S-CSCF 432 in IMS core 430 over 5G network core 420 and 5G RAN 410. Once re-registered, the SIP in UE 401 initiates a MO IMS voice session with IMS core 430 over the highest priority one of P-CSCFs 431 via 5G RAN 410 and 5G core 420.

Figure 6:
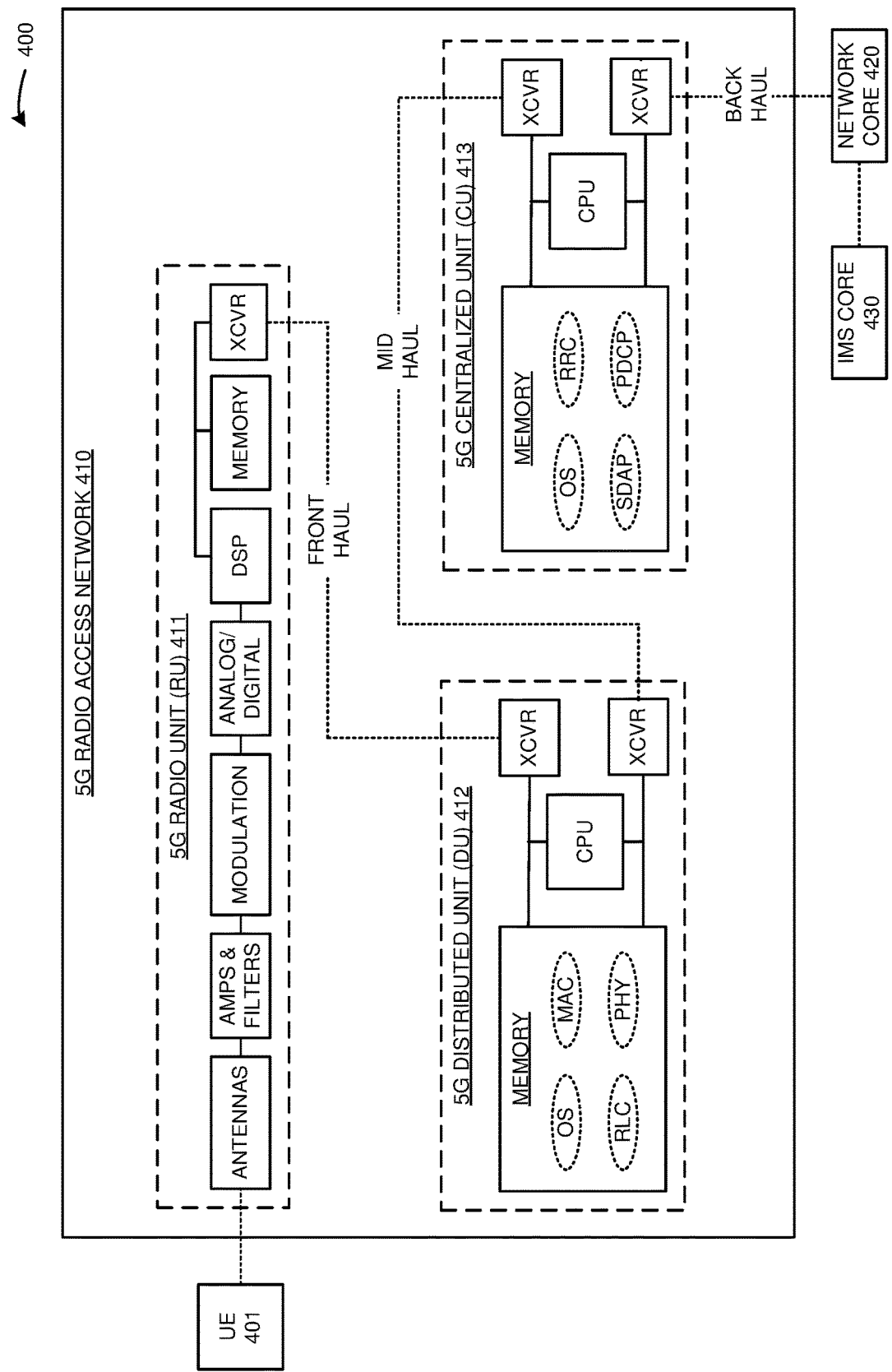
FIG. 6 illustrates a 5G Radio Unit (RU), a 5G Distributed Unit (DU), and a 5G Centralized Unit (CU) that delivers the MO IMS voice session to the 5G UE.

FIG. 6 illustrates 5G RU 411, 5G DU 412, and 5G CU 413 that deliver an MO IMS voice call to 5G UE 401. RU 411, DU 412, and CU 413 comprise an example of wireless access node 120, although wireless access node 120 may differ. RU 411 comprises antennas, amplifiers, filters, modulation, analog-to-digital interfaces, DSP, memory, and transceivers (XCVRs) that are coupled over bus circuitry. UE 401 is wirelessly coupled to the antennas in RU 411 over 5GNR links. Transceivers in 5G RU 411 are coupled to transceivers in 5G DU 412 over fronthaul links like enhanced Common Public Radio Interface (eCPRI). Transceivers in LTE RU 412 are coupled to transceivers in DU 432 over fronthaul links like Common Public Radio Interface (CPRI). The DSP in RU 411 executes its operating system and radio applications to exchange 5GNR signals with UE 401 and to exchange 5GNR data units with DU 412.

For the uplink, the antennas receive wireless signals from UE 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSP. The DSP transfers corresponding 5GNR symbols to DU 412 over the transceivers.

For the downlink, the DSP receives downlink 5GNR symbols from DU 412. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UE 401 that transport the downlink 5GNR signaling and data.

DU 412 comprises memory, CPU, and transceivers that are coupled over bus circuitry. The memory in 5G DU 412 stores operating systems and 5GNR network applications like PHY, MAC, and RLC. CU 413 comprises memory, CPU, and transceivers that are coupled over bus circuitry. The memory in CU 413 stores an operating system and 5GNR network applications like PDCP, SDAP, and RRC. A transceiver in 5G DU 412 is coupled to a transceiver in RU 411 over front-haul links. A transceiver in DU 412 is coupled to transceivers in CU 413 over mid-haul links. A transceiver in CU 413 is coupled to network core 420 over backhaul links.

RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, guard-insertion/guard-deletion, parsing/de-parsing, control insertion/removal, interleaving/de-interleaving, Forward Error Correction (FEC) encoding/ decoding, channel coding/decoding, channel estimation/ equalization, and rate matching/de-matching, scrambling/ descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

In operation, the RRC in CU 413 receives attachment signaling from UE 401 over RU 411 and DU 412. The RRC in CU 413 transfers a registration request for UE 401 to AMF 421 in 5G network core 420. The RRC in CU 413 receives network addresses, QoS metrics, and a prioritized list of network addresses for P-CSCFs 431 from AMF 421. The prioritized list of network addresses for P-CSCFs 431 allows UE 401 to initiate a MO IMS voice call session or some other type of media session with IMS core 430. The RRC in CU 413 transfers the network addressing, QoS metrics, and network addresses for P-CSCFs 131 to UE 401 over DU 412 and RU 411. The RRC in CU 413 controls DU 412 and RU 411 to serve UE 401. The RRC in CU 413 exchanges user signaling with UE 401 over DU 412 and RU 411. The RRC in CU 413 exchanges network signaling with AMF 421 and SMF 422 over backhaul links. The SDAP in CU 413 exchanges user data UE 401 over DU 412 and RU 411. The SDAP in CU 413 exchanges user data with UPF 423 over backhaul links.

The SDAP in CU 413 receives SIP message for UE 401 to register with IMS core 430 from UE 401 over RU 411 and DU 412. The SDAP in CU 413 transfers the SIP message to UPF 423 over backhaul links. The RRC in CU 413 receives a registration accept message from IMS core 430 over SMF 432 in 5G network core 420. The RRC in CU 413 transfers the registration accept message to UE 401 over DU 412 and RU 411. The RRC in CU 413 receives an update session request from SMF 422 in 5G network core 420. The RRC in CU 413 transfers the update session request to UE 401 via Protocol Configuration Options (PCO) over DU 412 and RU 411. The update session request directs UE 401 to re-register with IMS core 430 indicates a prioritized list of network addresses for P-CSCFs 431 to re-register over. The SDAP in CU 413 receives a SIP message for UE 401 to re-register with IMS core 430. The SDAP transfers the SIP message to UPF 423 in 5G network core 420.

Figure 7:
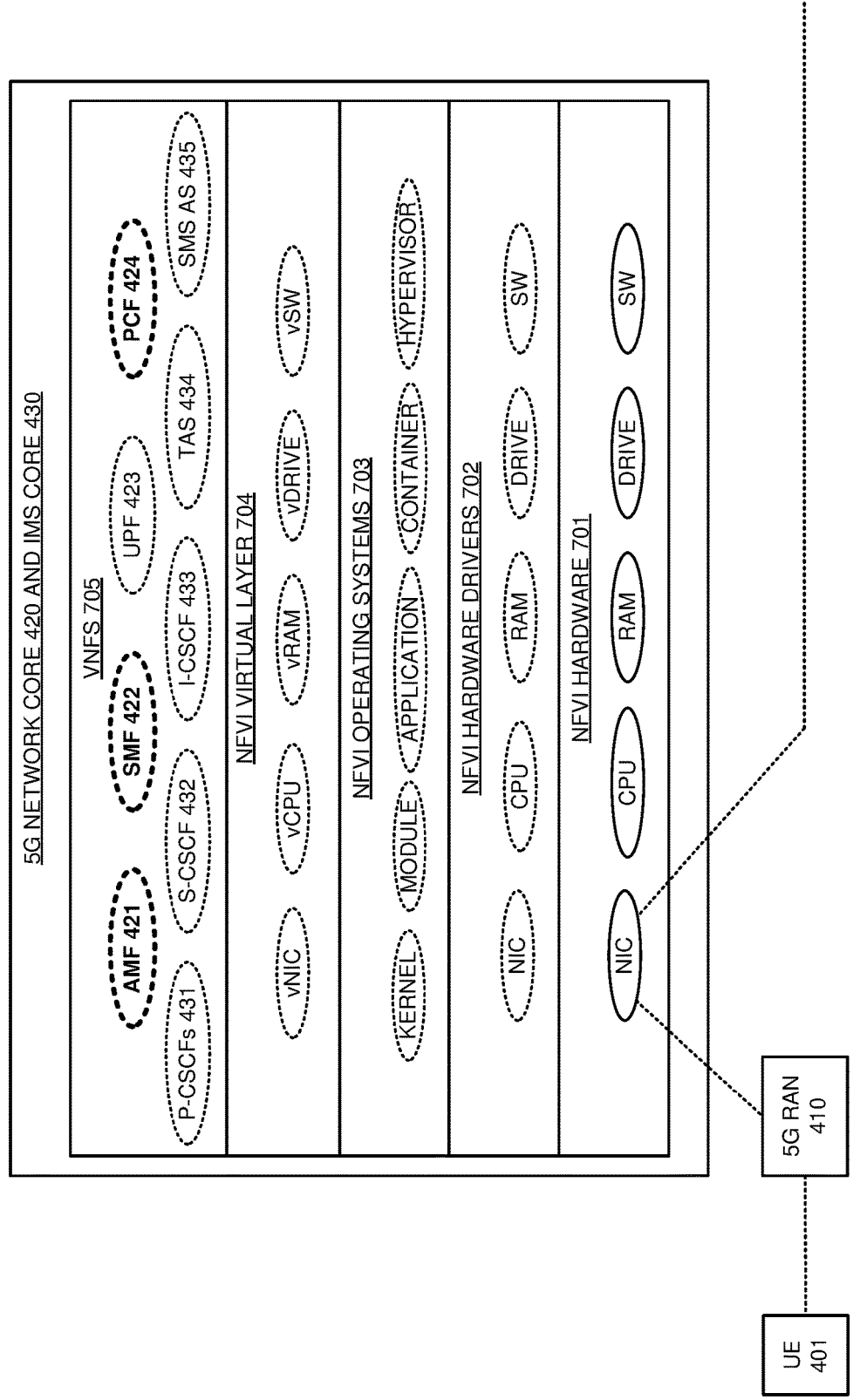
FIG. 7 illustrates a 5G wireless network core and Internet Protocol Multimedia Subsystem (IMS) core that deliver the MO IMS voice session to the 5G UE.

FIG. 7 illustrates 5G wireless network core 420 and IMS core 430 that serve UE 401 with an MO IMS voice session. Wireless network core 420 and IMS core 430 comprise an example of network circuitry 130, although network circuitry 130 may differ. Wireless network core 420 and IMS core 430 are an integrated system that uses shared Network Function Virtualization Infrastructure (NFVI) hardware, however wireless network core 420 and IMS core 430 may use separate hardware systems. Wireless network core 420 and IMS core 430 comprise NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMF 421, SMF 422, UPF 423, PCF 424, P-CSCFs 431, S-CSCF 432, I-CSCF 433, TAS 434, and SMS AS 435. Other VNFs like Network Slice Selection Function (NSSF), Authentication Server Function (AUSF), Unified Data Manager (UDM), Network Exposure Function (NEF), are typically present but are omitted for clarity. Wireless network core 420 and IMS core 430 may be located at a single site or distributed across multiple geographic locations. The NIC is coupled to 5G RAN 410 and to external systems. NFVI hardware 701 executes NFVI hardware drivers 702, NFVI operating systems 703, NFVI virtual layer 704, and NFVI VNFs 705 to serve UE 401 over 5G RAN 410.

Figure 8:
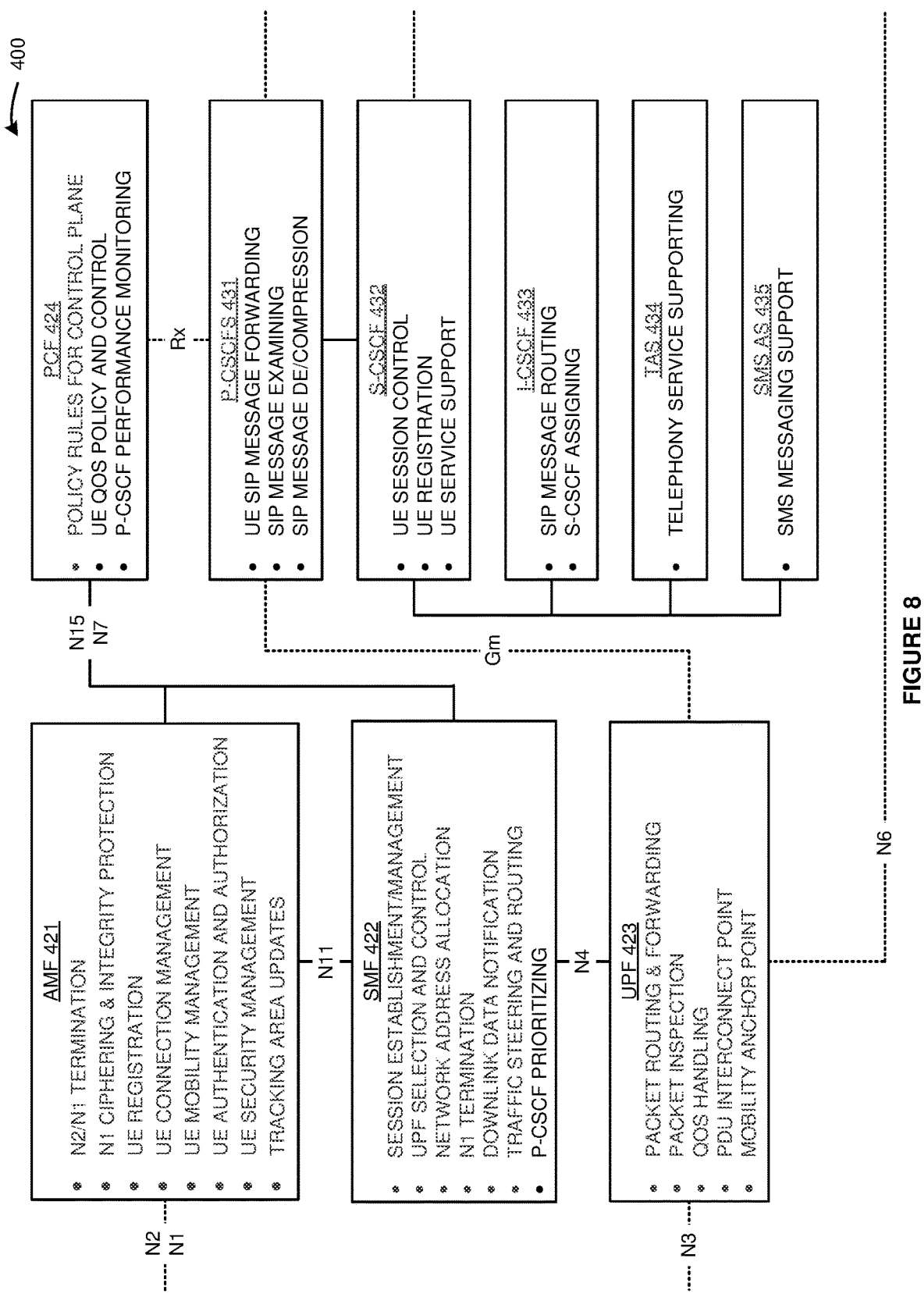
FIG. 8 illustrates the 5G wireless network core and Internet Protocol Multimedia Subsystem (IMS) core that deliver the MO IMS voice session to the 5G UE.

FIG. 8 further illustrates 5G wireless network core 420 and IMS core 430 that that serve 5G UE 401 with an MO IMS voice session. AMF 421 performs N2/N1 termination, N1 ciphering & integrity protection, UE registration, SMF/PCF selection, UE connection/mobility management, UE authentication and authorization, UE security management, and tracking area updates. SMF 422 performs session establishment/management, network address allocation, N1 termination, downlink data notification, traffic steering and routing, and P-CSCF prioritizing. UPF 423 performs packet routing & forwarding, packet inspection, QoS handling, PDU interconnection, and mobility anchoring. PCF 424 distributes UE policies to the control plane, controls UE Quality-of-Service (QoS), and monitors P-CSCF performance. P-CSCFs 431 performs UE SIP message forwarding, SIP message examining, SIP message compression, and SIP message decompression. S-CSCF 432 performs UE session control, UE registration, and UE service support. I-CSCF 433 performs SIP message routing and S-CSCF assigning. TAS 434 performs telephony service support. SMS AS 435 performs SMS messaging support. Although not shown for clarity, a Network Slice Selection Function (NSSF) performs slice discovery, AMF discovery, slice authorization, and slice prioritization. An Authentication Server Function (AUSF) performs UE authentication with Authentication and Key Agreement (AKA) credentials and handles UE authorizations. A User Data Management (UDM) handles UE context, UE subscription data, and UE authentication keys. A Network Repository Function (NRF) performs network function authentication and authorization, selection, security, and event registration/subscriptions.

In operation, UE 401 wirelessly attaches to RU 411 and transfers attachment signaling to CU 413 over RU 411 and DU 412. CU 413 transfers a registration request for UE 401 to AMF 421. AMF 421 interacts other network functions to authenticate and authorize UE 401 for wireless data services. Responsive to the authentication and authorization, AMF 421 interacts with other network functions to select Quality-of-Service (QoS) metrics and network addresses for UE 401. AMF 421 transfers the network addresses, QoS metrics, and a prioritized list of network addresses for P-CSCFs 431 to CU 413. The prioritized list of network addresses for P-CSCFs 431 allows UE 401 to initiate a MO IMS voice session over IMS core 430. CU 413 transfers the network addressing, QoS metrics, and network addresses for P-CSCFs to UE 401 over DU 412 and RU 411. UE 401 exchanges user signaling with AMF 421 and SMF 422 over RU 411, DU 412, and CU 413. UE 401 exchanges user data with UPF 423 over RU 411, DU 412, and CU 413.

UPF 423 receives a SIP message from UE 401 over RAN 410. The SIP message indicates a registration request for UE 401 to register with IMS core 430. UPF 423 identifies the network address in the SIP message and transfers the SIP message to the addressed P-CSCF of P-CSCFs 431. The addressed P-CSCF of P-CSCFs 431 receives the SIP message and forwards the SIP message to S-CSCF 432. S-CSCF 432 interacts with other IMS functions to authenticate and authorize UE 401 for IMS voice and IMS texting services. S-CSCF 432 transfers a registration accept message to PCF 424. PCF 424 transfers the registration accept message to SMF 422. SMF 422 transfers the registration accept message to UE 401 via PCO over 5G RAN 410.

PCF 424 monitors the performance of P-CSCFs 431 over the Rx interface. PCF 424 pulls CPU occupancy, memory occupancy, active users, geolocation, and/or other performance metrics for the ones of P-CSCFs 431. PCF 424 pings P-CSCFs 431 to determine the responsiveness of the ones of P-CSCFs 431. In some examples, PCF 424 generates SIP invite messages that are addressed to itself to monitor the health of P-CSCFs 431. PCF 424 may transfer these SIP messages to the ones of P-CSCFs 431. When PCF 424 receives SIP response messages from ones of P-CSCFs 431, PCF 424 determines those ones of P-CSCFs 431 are operational. When PCF 424 does not receive response SIP messages from ones of P-CSCFs 431, PCF 424 determines those ones of P-CSCFs 431 are non-operational. PCF 431 may indicate to SMF 422 which ones of P-CSCFs 431 responded to the SIP invite messages.

PCF 424 transfers the performance metrics and responsiveness for P-CSCFs 431 to SMF 422. SMF 422 ranks the ones of P-CSCFs 431 by their performance and responsiveness and generates a prioritized list of P-CSCFs 431. The prioritized list indicates the ranks and network addresses of the ones of P-CSCFs 431. SMF 422 ranks P-CSCFs with better performance metrics and faster responsiveness higher than P-CSCFs with lower performance metrics and slower responsiveness. SMF 422 determines that UE 401 is registered with a low priority one of P-CSCFs 431. In response to the low priority registration, SMF 422 transfers an update session request to UE 401 via PCO over 5G RAN. The update session request indicates the prioritized P-CSCF list and directs UE 401 to re-register with IMS core 430.

Advantageously, SMF 422 preempts IMS failure by forcing UE 401 to re-register with better performing P-CSCFs.

In some examples, SMF 422 transfers the prioritized P-CSCF list to AMF 421 and drives AMF 421 to broadcast the prioritized P-CSCF list in a System Information Block (SIB). AMF 421 may generate SIBs that indicate the prioritized P-CSCF list and transfer the SIB to 5G RAN 410. 5G RAN 410 may wirelessly broadcast the SIB to UE 401 and other 5G UEs. Upon receiving the SIB, UE 401 may determine to re-register with IMS core 430.

UPF 423 receives a SIP message from UE 401 over 5G RAN 410. The SIP message indicates a re-registration request for UE 401 to register with IMS core 430 based on the prioritized P-CSCF list. UPF 423 identifies the network address in the SIP message and transfers the SIP message to the addressed P-CSCF of P-CSCFs 431. The addressed P-CSCF of P-CSCFs 431 receives the SIP message and forwards the SIP message to S-CSCF 432. S-CSCF 432 interacts with other IMS functions to re-register UE 401 for IMS voice and IMS texting services over the addressed one of P-CSCFs 431. S-CSCF 432 transfers a registration accept message for UE 401 to PCF 424. PCF 424 transfers the registration accept message to SMF 422. SMF 422 transfers the registration accept message to UE 401 via PCO over 5G RAN 410. Once re-registered, UE 401 initiates a MO IMS voice session with IMS core 430 over the highest priority one of P-CSCFs 431 via 5G RAN 410 and 5G core 420.

Figure 9:
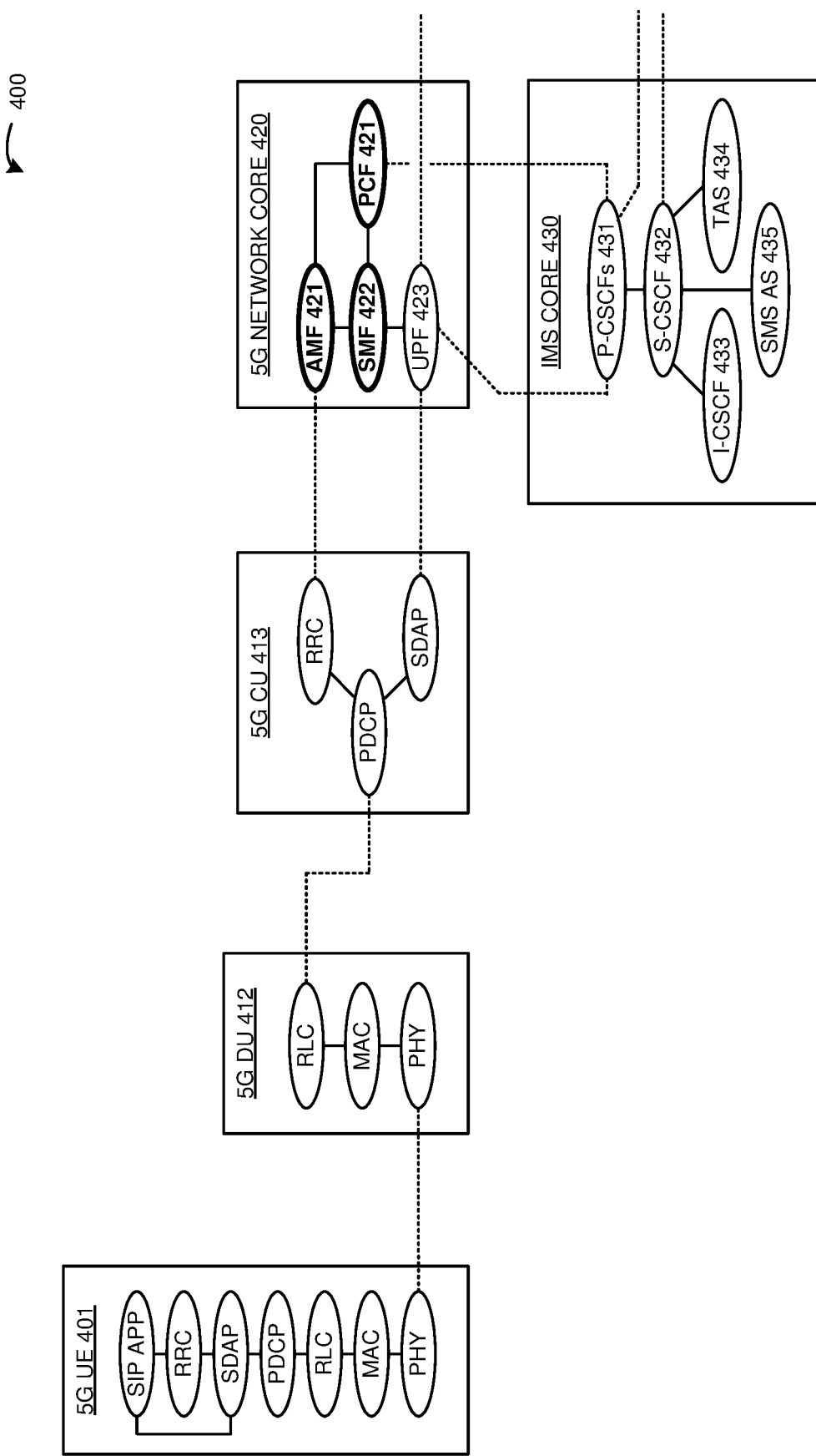
FIG. 9 illustrates the operation of the 5G communication network to deliver the MO IMS voice session to the 5G UE.

FIG. 9 illustrates the operation of 5G communication network 400 to serve UE 401 with an MO IMS voice call. The operation is exemplary and may vary in other examples. The RRC in UE 401 wirelessly attaches to the RRC in CU 413 over the PDCPs, RLCs, MACs, and PHYs. The RRC in CU 413 transfers a registration request for UE 401 to AMF 421. AMF 421 interacts other network functions to authenticate and authorize UE 401 for wireless data services. Responsive to the authentication and authorization, AMF 421 interacts with other network functions to generate UE context for UE 101. The UE context comprises Quality-of-Service (QoS) metrics, slice identifiers, network addresses, and a prioritized list of network addresses for P-CSCFs 431. The prioritized list of network addresses for P-CSCFs 431 allows UE 401 to initiate a MO IMS voice call session, or some other type of IMS media session, with IMS core 430. AMF 421 transfers the UE context for UE 401 to the RRC in CU 413. The RRC in CU UE context to the RRC in UE 401 over the PDCPs, RLCs, MACs, and PHYs.

The RRC in UE 401 drives the SIP in UE 401 to generate a SIP message to register with IMS core 430. The SIP in UE 401 uses the network addresses for P-CSCFs 431 to generate a SIP message to register with IMS core 430. The SIP transfers the SIP message to the SDAP in UE 413. The SDAP in UE 401 transfers the SIP message to the SDAP in CU 413 over the PDCPs, RLCs, MACs, and PHYs. The SDAP in CU 413 transfers the SIP message to UPF 423. UPF 423 identifies the network address in the SIP message and transfers the SIP message to the addressed P-CSCF of P-CSCFs 431. The addressed P-CSCF of P-CSCFs 431 receives the SIP message and forwards the SIP message to S-CSCF 432. S-CSCF 432 interacts with other IMS functions to authenticate and authorize UE 401 for IMS voice and IMS texting services. S-CSCF 432 transfers a registration accept message to PCF 424. PCF 424 transfers the registration accept message to SMF 422. SMF 422 transfers the registration accept message to the RRC in UE 401 via PCO over the PDCPs, RLCs, MACs, and PHYs.

PCF 424 monitors the performance of P-CSCFs 431. PCF 424 retrieves CPU occupancy, memory occupancy, active users, geolocation, and/or other performance metrics for the ones of P-CSCFs 431. PCF 424 pings P-CSCFs 431 to determine the responsiveness of the ones of P-CSCFs 431. PCF 424 transfers the performance metrics and responsiveness for P-CSCFs 431 to SMF 422. SMF 422 ranks the ones of P-CSCFs 431 by their performance and responsiveness and generates a prioritized list of P-CSCFs 431. The prioritized list indicates the ranks and network addresses of the ones of P-CSCFs 431. SMF 422 ranks P-CSCFs with better performance metrics and faster responsiveness higher on the prioritized list than P-CSCFs with lower performance metrics and slower responsiveness. SMF 422 determines that UE 401 is registered with a low priority one of P-CSCFs 431. In response to the low priority registration, SMF 422 transfers an update session request that characterizes the prioritized list of P-CSCFs to the RRC in UE 401 via PCO over the PDCPs, RLCs, MACs, and PHYs.

The RRC in UE 401 wirelessly receives the update session request from SMF 422. In response, the RRC in UE 401 selects the highest ranked one of P-CSCFs 431 for re-registration. The RRC in UE 401 drives the SIP to generate a SIP message to re-register with IMS core 401 using the highest priority one of P-CSCFs 431. The SIP in UE 401 uses the network address for the highest priority P-CSCF to generate a SIP message to re-register with IMS core 430. The SIP in UE 401 transfers the SIP message to the SDAP in UE 401. The SDAP in UE 401 transfers the SIP message to the SDAP in CU 413 over the PDCPs, RLCs, MACs, and PHYs. The SDAP in CU 413 transfers the SIP message to UPF 423. UPF 423 identifies the network address in the SIP message and transfers the SIP message to the highest priority one of P-CSCFs 431. The highest priority one of P-CSCFs 431 receives the SIP message and forwards the SIP message to S-CSCF 432. S-CSCF 432 interacts with other IMS functions to re-register UE 401 for IMS voice and texting services. S-CSCF 432 transfers a registration accept message for UE 401 to PCF 424. PCF 424 transfers the registration accept message to SMF 422. SMF 422 transfers the registration accept message for UE 401 to the RRC in CU 413. The RRC in CU 413 transfers the registration accept message to the RRC in UE 401 over the PDCPs, RLCs, MACs, and PHYs. Once re-registered, UE 401 initiates a MO IMS voice session with IMS core 430 over the highest priority one of P-CSCFs 431 over 5G RAN 410 and 5G network core 420.

The wireless data network circuitry described above comprises computer hardware and software that form special-purpose circuitry to deliver a media content service to wireless UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose circuitry to deliver the media content service to wireless UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to wirelessly deliver a media-content service to wireless User Equipment (UEs), the method comprising:
   network circuitry executing wireless network functions and media content functions;
   the media content functions distributing network addresses to the wireless UEs which use the network addresses to transfer media-content for the media-content service;
   the wireless network functions monitoring performance of the media content functions;
   the wireless network functions prioritizing the media content functions based on their performance; and
   the wireless network functions transferring a prioritized list of the media content functions to the wireless UEs, wherein the wireless UEs communicate with the media content functions on a priority basis responsive to the prioritized list.

2. The method of claim 1 wherein the media-content functions distributing the network addresses to the wireless UEs comprises Internet Protocol Multimedia Subsystem (IMS) functions distributing the network addresses to the wireless UEs.

3. The method of claim 1 wherein the media-content functions distributing the network addresses to the wireless UEs comprises Internet Protocol Multimedia Subsystem (IMS) Call State Control Functions (CSCFs) distributing the network addresses to the wireless UEs.

4. The method of claim 1 wherein the wireless network functions monitoring the performance of the media content functions comprises Policy Control Functions (PCFs) monitoring the performance of the media content functions.

5. The method of claim 1 wherein the wireless network functions prioritizing the media content functions based on their performance comprises at least one of Session Management Functions (SMFs) and Policy Control Functions (PCFs) prioritizing the media content functions based on their performance.

6. The method of claim 1 wherein the wireless network functions transferring the prioritized list of the media content functions to the wireless UEs comprises at least one of Session Management Functions (SMFs) and Access and Mobility Management Functions (AMFs) transferring the prioritized list of the media content functions to the wireless UEs.

7. The method of claim 1 wherein the wireless network functions transferring the prioritized list of the media content functions to the wireless UEs comprises Access and Mobility Management Functions (AMFs) broadcasting System Information Blocks (SIBs) that indicates the prioritized list of the media content functions.

8. The method of claim 1 wherein the wireless network functions monitoring performance of the media content functions and prioritizing the media content functions based on their performance comprises:
   Policy Control Functions (PCFs) generating Session Initiation Protocol (SIP) invite messages;
   The PCFs transferring the SIP invite messages to the media content functions;
   The PCFs receiving SIP response messages from the media content functions; and
   Session Management Functions (SMFs) prioritizing the media content functions based on the SIP response messages from the media content functions.

9. The method of claim 1 wherein the wireless network functions prioritizing the media content functions based on their performance and transferring the prioritized list of the media content functions to the wireless UEs comprise Session Management Functions (SMFs) prioritizing the media content functions based on their performance and transferring the prioritized list of the media content functions to the wireless UEs.

10. The method of claim 1 wherein:
the wireless UEs initially communicate with the media content functions by initially communicating with initial Proxy Call State Control Functions (P-CSCFs); and
the wireless UEs subsequently communicate with the media content functions on the priority basis responsive to the prioritized list by registering with new Proxy Call State Control Functions (P-CSCFs) that have higher priority than the initial P-CSCFs.

11. A wireless communication network configured to wirelessly deliver a media content service to wireless User Equipment (UEs), the wireless communication network comprising:
network circuitry configured to execute wireless network functions and media content functions;
the media content functions configured to distribute network addresses to the wireless UEs which use the network addresses to transfer media-content for the media-content service;
the wireless network functions configured to monitor performance of the media content functions;
the wireless network functions configured to prioritize the media content functions based on their performance; and
the wireless network functions configured to transfer a prioritized list of the media content functions to the wireless UEs, wherein the wireless UEs communicate with the media content functions on a priority basis responsive to the prioritized list.

12. The wireless communication network of claim 11 wherein the media-content functions comprise Internet Protocol Multimedia Subsystem (IMS) functions configured to distribute the network addresses to the wireless UEs.

13. The wireless communication network of claim 11 wherein the media-content functions comprise Internet Protocol Multimedia Subsystem (IMS) Call State Control Functions (CSCFs) configured to distribute the network addresses to the wireless UEs.

14. The wireless communication network of claim 11 wherein the wireless network functions comprise Policy Control Functions (PCFs) configured to monitor the performance of the media content functions.

15. The wireless communication network of claim 11 wherein the wireless network functions comprise at least one of Session Management Functions (SMFs) and Policy Control Functions (PCFs) configured to prioritize the media content functions based on their performance.

16. The wireless communication network of claim 11 wherein the wireless network functions comprise at least one of Session Management Functions (SMFs) and Access and Mobility Management Functions (AMFs) configured to transfer the prioritized list of the media content functions to the wireless UEs.

17. The wireless communication network of claim 11 wherein the wireless network functions comprise Access and Mobility Management Functions (AMFs) configured to broadcast System Information Blocks (SIBs) that indicate the prioritized list of the media content functions.

18. The wireless communication network of claim 11 wherein the wireless network functions comprise:
Policy Control Functions (PCFs) configured to generate Session Initiation Protocol (SIP) invite messages;
The PCFs configured to transfer the SIP invite messages to the media content functions;
The PCFs configured to receive SIP response messages from the media content functions; and
Session Management Functions configured to prioritize the media content functions based on the SIP response messages from the media content functions.

19. The wireless communication network of claim 11 wherein the wireless network functions comprise Session Management Functions (SMFs) prioritizing the media content functions based on their performance and transferring the prioritized list of the media content functions to the wireless UEs.

20. The wireless communication network of claim 11 wherein:
the wireless UEs are configured to initially communicate with the media content functions by initially communicating with initial Proxy Call State Control Functions (P-CSCFs); and
the wireless UEs are configured to subsequently communicate with the media content functions on the priority basis responsive to the prioritized list by registering with new Proxy Call State Control Functions (P-CSCFs) that have higher priority than the initial P-CSCFs.

* * * * *